(12) United States Patent
Khan

(10) Patent No.: US 11,748,119 B2
(45) Date of Patent: Sep. 5, 2023

(54) IN-APP PASSWORD BASED LOG-IN DETECTION USING USER INTERFACE ELEMENTS

(71) Applicant: Samsung Electronics Co., Ltd., Suwon-si (KR)

(72) Inventor: Hashir Khan, Milpitas, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/508,870

(22) Filed: Oct. 22, 2021

(65) Prior Publication Data

US 2022/0365794 A1 Nov. 17, 2022

Related U.S. Application Data

(60) Provisional application No. 63/187,548, filed on May 12, 2021.

(51) Int. Cl.
| | |
|---|---|
| G06F 3/048 | (2013.01) |
| G06F 9/451 | (2018.01) |
| G06F 3/0482 | (2013.01) |
| G06F 3/04812 | (2022.01) |
| G06F 21/36 | (2013.01) |

(52) U.S. Cl.
CPC ............ G06F 9/451 (2018.02); G06F 3/0482 (2013.01); G06F 3/04812 (2013.01); G06F 21/36 (2013.01)

(58) Field of Classification Search
None
See application file for complete search history.

(56) References Cited

U.S. PATENT DOCUMENTS

| | | | |
|---|---|---|---|
| 9,047,103 B2 | 6/2015 | Fortune et al. | |
| 9,122,862 B2 | 9/2015 | Miwa et al. | |
| 10,791,126 B2* | 9/2020 | Jakobsson | H04L 63/145 |
| 10,901,758 B2 | 1/2021 | Arar et al. | |
| 2005/0091510 A1* | 4/2005 | McKeon | G06F 9/451 |
| | | | 713/185 |
| 2007/0088635 A1* | 4/2007 | King | G06Q 10/00 |
| | | | 705/30 |
| 2008/0148235 A1 | 6/2008 | Foresti et al. | |
| 2012/0266236 A1 | 10/2012 | Miwa et al. | |

(Continued)

FOREIGN PATENT DOCUMENTS

| | | |
|---|---|---|
| JP | 2021-060645 A | 4/2021 |
| KR | 10-1838400 B1 | 3/2018 |
| KR | 10-2019-0073234 A | 6/2019 |

OTHER PUBLICATIONS

International Search Report & Written Opinion dated Jun. 9, 2022 for International Application PCT/KR2022/003243 from Korean Intellectual Property Office, pp. 1-6, Republic of Korea.

*Primary Examiner* — Thanh T Vu
(74) *Attorney, Agent, or Firm* — SHERMAN IP LLP; Kenneth L. Sherman; Steven Laut

(57) ABSTRACT

A method includes storing a user interface (UI) hierarchy of one or more screens associated with an application. The one or more screens are presented by an electronic device. A first screen presented by the electronic device is identified as an authentication screen of the application based on the stored UI hierarchy and/or UI elements of the screen. An authentication result is determined based on a deviation of the first screen or presentation of a second screen by the electronic device.

20 Claims, 8 Drawing Sheets

(56) References Cited

U.S. PATENT DOCUMENTS

| | | |
|---|---|---|
| 2014/0130139 A1* | 5/2014 | Lee .................. H04W 12/06 |
| | | 726/4 |
| 2015/0186661 A1 | 7/2015 | Hirase |
| 2018/0217722 A1 | 8/2018 | Venkataraman et al. |
| 2019/0132309 A1 | 5/2019 | Wei |
| 2019/0354255 A1 | 11/2019 | Leme et al. |
| 2019/0391793 A1 | 12/2019 | Margolis et al. |
| 2020/0134168 A1 | 4/2020 | Hwang |

* cited by examiner

IN-APP PASSWORD BASED LOG-IN DETECTION USING USER INTERFACE ELEMENTS

CROSS-REFERENCE TO RELATED APPLICATIONS

This application claims the priority benefit of U.S. Provisional Patent Application Ser. No. 63/187,548, filed May 12, 2021, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to user authentication, and in particular, to determining an authentication result based on a deviation of a first screen or presentation of a second screen by an electronic device.

BACKGROUND

With security becoming core to enterprise mobile use cases as well as providing a seamless user experience, there is a need to allow enterprise information technology (IT) administrators to continuously authenticate device users using multiple biometrics authentication factors and user behavior data captured on the device. Some authentication solutions, however, only offer initial moment authentication with methods such as password, pin, pattern or fingerprint, and there is a requirement for continuous authentication using multiple factors. Most authentication solutions are cloud-based and do not have device level access, which provides insights to take proactive action.

SUMMARY

One or more embodiments relate to user authentication. In some embodiments, a method includes storing a user interface (UI) hierarchy of one or more screens associated with an application. The one or more screens are presented by an electronic device. A first screen presented by the electronic device is identified as an authentication screen of the application based on one of the stored UI hierarchy, UI elements of the one or more screens, or a combination thereof. An authentication result is determined based on a deviation of the first screen or presentation of a second screen by the electronic device.

In some embodiments, a non-transitory processor-readable medium that includes a program that when executed by a processor performs an authentication method that includes storing, by the processor, a UI hierarchy of one or more screens associated with an application. The one or more screens are presented by an electronic device. The processor further identifies a first screen presented by the electronic device as an authentication screen of the application based on one of the stored UI hierarchy, UI elements of the one or more screens, or a combination thereof. The processor still further determines an authentication result based on a deviation of the first screen or presentation of a second screen by the electronic device.

In some embodiments, an apparatus includes a memory storing instructions. At least one processor executes the instructions including a process configured to store a UI hierarchy of one or more screens associated with an application. The one or more screens are presented by an electronic device. The process is further configured to identify a first screen presented by the electronic device as an authentication screen of the application based on one of the stored UI hierarchy, UI elements of the one or more screens, or a combination thereof. The process is additionally configured to determine an authentication result based on a deviation of the first screen or presentation of a second screen by the electronic device.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide user authentication. In one or more embodiments, a method includes storing a user interface (UI) hierarchy of one or more screens associated with an application. The one or more screens are presented by an electronic device. A first screen presented by the electronic device is identified as an authentication screen of the application based on the stored UI hierarchy, UI elements of the one or more screens, or a combination thereof. An authentication result is determined based on a deviation of the first screen or presentation of a second screen by the electronic device.

Some embodiments determine the successful and failed authentication attempts for different user applications as a new factor in a multi-factor determination of an authorizeduser. User applications include, but not limited to finance related applications (banking, stock trading, . . . ), social media applications, or any other application that uses a username and password. By knowing whether the user has successfully logged into these different user applications (allowing for tolerable failure rates) a user authentication pattern could be developed, which may be used to provide a score for the new authentication factor.

Determining successful and failed authentication attempts for user applications is trivial for biometrics based authentication such as fingerprint, facial recognition, etc. since these are electronic device (e.g., laptops, smart phones, smart watches, smart pads, etc.) level features, which require hardware backing and hence provide a clear yes/no result for user authentication for all user applications on the electronic device. What is not trivial is to determine the authentication result for a password based authentication such as a username and password, since there is no common layer at which the authentication result is obtained (unlike the biometrics there is no single hardware module on a device that provides a yes/no result). Therefore, the username and password are generated and consumed completely within the application. Additionally, the authentication can be implemented using different security protocols by different applications, and hence looking for authentication results from the server by sniffing the network traffic might not always work.

Figure 1:
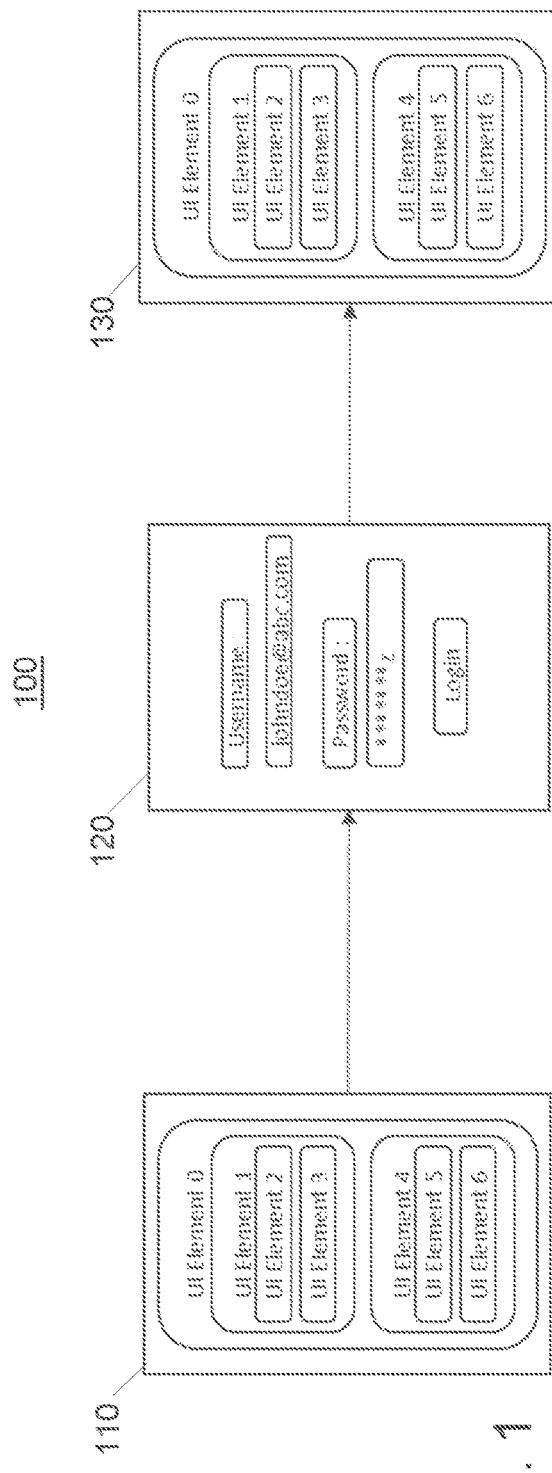
FIG. 1 shows a block diagram of a high level authentication flow for each application authentication user experience (UX), according to some embodiments.

FIG. 1 shows a block diagram of a high level authentication flow 100 for each application authentication user experience (UX), according to some embodiments. One or more embodiments use the user interface (UI) elements and UX flow of an application's authentication process to determine whether the authentication has succeeded or failed. Though the username and password UI elements in which the user enters the data in different applications are designed using different UI elements and follow different UX flows, a common criteria may be used that underlies most username and password based authentications. When a user is using an application, zero or multiple screens may be shown to the user before the user is asked to authenticate. For the purpose of clarification, a screen is defined as any UI screen displayed to the user and has multiple UI elements in it including but not limited to layouts, textbox, edit textbox, password box, buttons, radio buttons, etc.

In some embodiments, whenever an application attempts to authenticate a user using a username/password based approach, the UI screen 120 will have the username and password fields and a submit/login button on the same screen 120, a username field pre-filled and password field and a submit/login button on the screen 120, or username and password fields on different screens with a submit/login button on the password screen. Once the authentication is successful, the UI screen 120 with these fields is removed and a brand new screen is displayed, and more screens are displayed later. If the authentication failed, then either the authentication screen remains or a failed screen is displayed or any of the previous screens are displayed.

In one or more embodiments, most of the UI elements in a screen 110 are displayed as a hierarchy, with multiple or one UI element nested in others, based on the function of that UI element. Zero or multiple screens may be shown to a user before the user is asked to authenticate. Most of the UI elements that become the leaf usually have some value associated with them. One screen is different from another screen if they have different hierarchies and even if they have same hierarchies, the values in the leaf UI elements are different. A password box usually has some special display properties that allow it to hide the input from the user's view.

Some embodiments use the generic concepts of UI elements and the authentication flow 100, to first capture the UI hierarchy of each screen 110 till the authentication screen 120 is displayed, and then later uses a new screen 130, which follows the authentication screen 120 to determine if the authentication was successful or failed. One or more new screens 130 may be shown upon successful authentication, or a failed screen may be shown upon a failed authentication. This is done for each application UX flow. Since there is mostly one app (or application) in the foreground in mobile devices it implies detecting the UX flow for the foreground application. This process may be used for different applications on the electronic device, according to some embodiments. By knowing whether the user has successfully logged into different user applications, a user authentication pattern is developed that is used as a new authentication factor.

Figure 2:
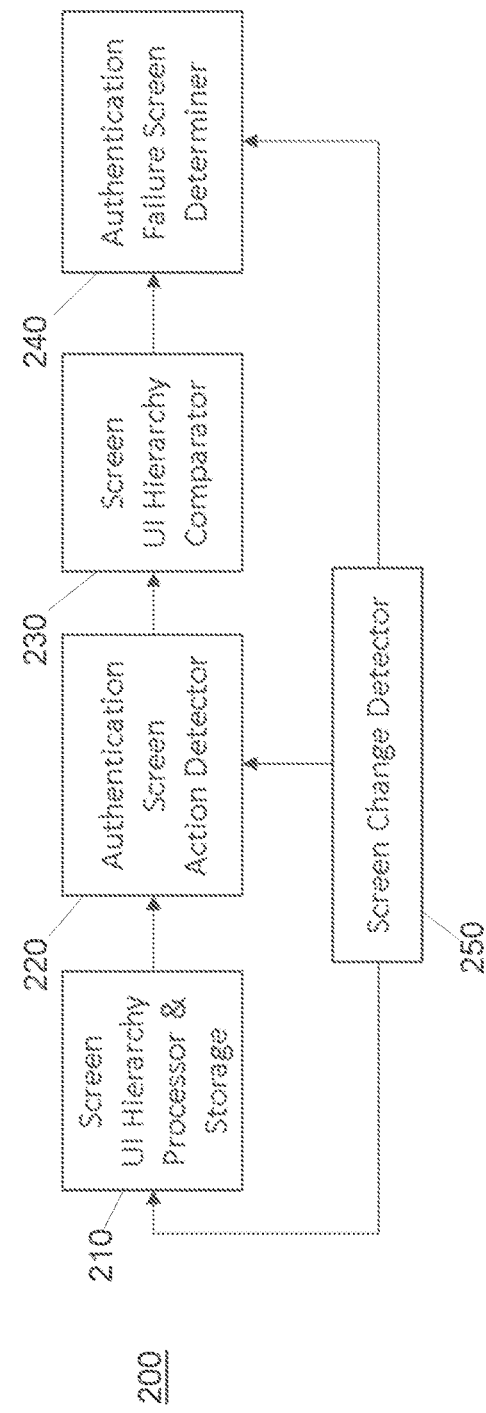
FIG. 2 shows a block diagram of a flow for UX authentication and screen change detection, according to some embodiments.

FIG. 2 shows a block diagram of a UX flow 200 for UX authentication and screen change detection, according to some embodiments. One or more embodiments provide a process to efficiently store the UI hierarchy for each screen in block 210. The UI hierarchy is usually provided by many mobile operating system (OS) platforms and the UI hierarchy may be easily obtained. In block 210, once the UI hierarchy for a screen is obtained, a unique identification (ID) is assigned for each UI element (in many cases such unique IDs are already provided by the relevant mobile OS, which may be used), and then a unique ID is assigned for each screen based on some standard hashing algorithms of all children UI elements. Each screen is stored with its hashcode along with an ordered list of its child elements. Each child element in turn is stored with its hashcode along with an ordered list of its child elements (similar to a tree structure). At the top level, all screens are displayed until the authentication screen is showed and are stored in an ordered list.

In some embodiments, block 220 provides an authentication screen and an action detector process, including processing to determine that a screen is an authentication screen. Many mobile OS platforms provide ways to indicate that a UI element is a password input type of UI element. This is used to determine the password field on the screen. The submit/login button may be determined using heuristics and searching for a UI element on the password screen that has the term "Submit" or "Login" or any equivalent word value as its text (this can be changed to use the corresponding words in different languages as well).

In one or more embodiments, block 230 provides for the screen UI hierarchy comparator processing. After the authentication screen action detector processing in block 220 completes its operation, the screen UI hierarchy comparator processing on block 230 captures the UI hierarchy of the screen and compares it with information of each screen stored in the ordered list of screen information previously stored by the screen UI hierarchy processor and storage processing of block 210. If either the authentication screen remains or any of the previous screens are displayed, in both cases these will be part of the ordered list of screen information and results in the authentication failure. If the screen is a new screen and is determined to be a failure screen by the authentication failure screen determiner processing of block 240, then the authentication is considered as failed. Otherwise, the authentication is considered as successful.

In some embodiments, the authentication failure screen determiner processing of block 240 determines authentication failure using heuristics and searching for a UI element on the screen that appears after the authentication screen, which is not any previously stored screens, and has the term "Failed" or "Retry" or any equivalent word value as its text (this can be changed to use the corresponding words in different languages as well).

In one or more embodiments, the screen change detector processing in block 250 determines a change in screen. The UI frameworks of many mobile OS platforms provide ways to notify software processes of changes in the screen UI. Even if such notifications are not provided, it is trivial to add such functionality to the UI framework. In one example embodiment, this functionality may be performed by detecting changes in a frame buffer of the screen of an electronic device, or other similar functionalities.

Figure 3:
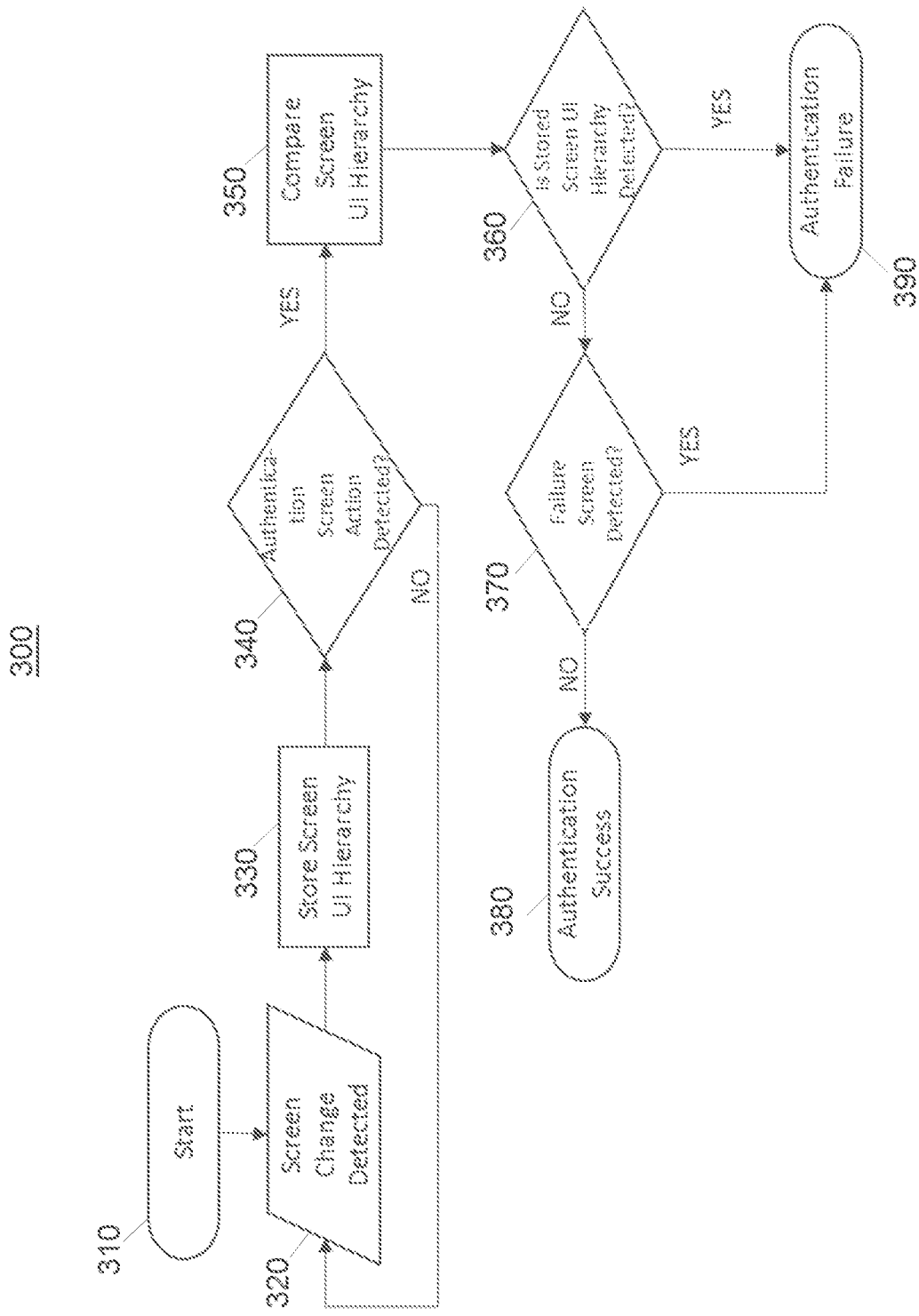
FIG. 3 shows a flow diagram for screen change detection and UX authentication processing, according to some embodiments.

FIG. 3 shows a flow diagram 300 for screen change detection and UX authentication processing, according to some embodiments. In block 310, the processing starts either by running a process in the background or upon triggering the start based on block 320 detecting a screen change as described regarding block 250 (FIG. 2), such as detecting changes in a frame buffer of the screen of an electronic device, or other similar functionalities. In block 330 the screen UI hierarchy is stored in memory. The UI hierarchy is usually provided by many mobile OS platforms and the UI hierarchy can be easily obtained from the UI framework of such platforms. Once the UI hierarchy for a screen is obtained, a unique ID is assigned for each UI element and then assign a unique ID for each screen based on a standard hashing algorithm of all children UI elements. Each Screen is stored with its hashcode and an ordered list of its child elements. Each child element in turn is stored with its hashcode along with an ordered list of its child elements (similar to a tree structure). At the top level all screens displayed until the authentication screen is showed are stored in an ordered list. In block 340 it is determined whether an authentication screen action is detected. Many mobile OS platforms provide ways to indicate that a UI element is of a password input type. This can be used to determine the password field on the screen. The submit/login button can be determined using heuristics and searching for a UI element on the password screen that has a "Submit" or "Login" or any equivalent word value as its text (this can be changed to use the corresponding words in different languages as well). The detection of the authentication screen and the pressing/selection of the submit/login button and the completion of the authentication operation are part of the functions of this processing block. If block 340 detects an authentication screen action, the processing proceeds to block 350, otherwise processing returns to block 320 awaiting detection of a screen change.

In one or more embodiments, in block 350 the screen UI hierarchy is compared by comparator processing that captures the UI hierarchy of the screen and compares it with information of each screen stored in the ordered list of screen information previously stored in block 330. In block 360, if the authentication screen remains or any of the previous screens are displayed, in both cases these are part of the ordered list of screen information and results in the authentication failure in block 390. If the screen is a new screen and is determined to be a failure screen by the authentication failure screen detector processing of block 370, then the authentication is considered as failed in block 390. Otherwise, the authentication is considered as successful in block 380. In some embodiments, the authentication failure screen detection processing of block 370 determines authentication failure using heuristics and searching for a UI element on the screen that appears after the authentication screen, which is not any previously stored screens, and has the term "Failed" or "Retry" or any equivalent word value as its text (this can be changed to use the corresponding words in different languages as well).

Figure 4:
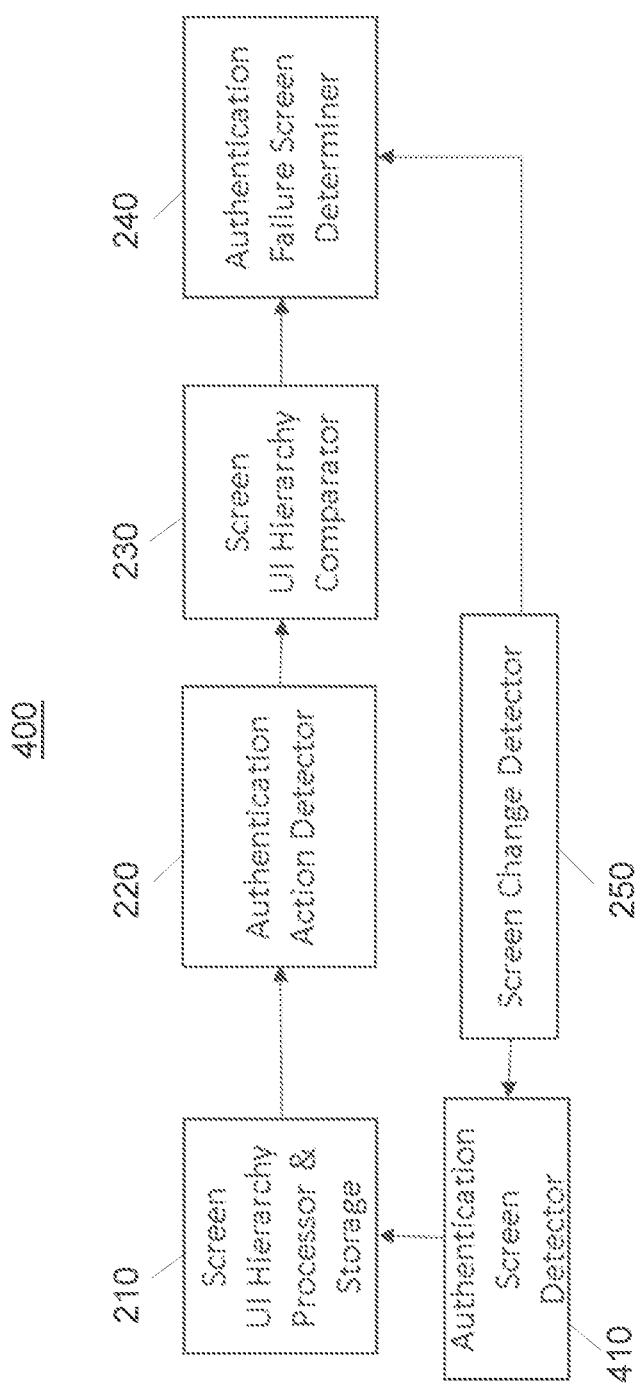
FIG. 4 shows a block diagram of a flow for UX authentication and screen change detection where screens are maintained in an ordered list(s), according to some embodiments.

FIG. 4 shows a block diagram of a flow 400 for UX authentication and screen change detection where screens are maintained in an ordered list(s), according to some embodiments. In some embodiments, flow 400 is similar to flow 200 (FIG. 2) and makes use of the fact that in some mobile UI frameworks the screens are already maintained in an ordered list. Therefore, instead of storing the screen UI hierarchy on every screen change, the flow 400 obtains this ordered list when the authentication screen is detected in block 410. In one or more embodiments, flow 400 makes use of the length of the password field to determine that in some cases that the authentication has failed.

Figure 5:
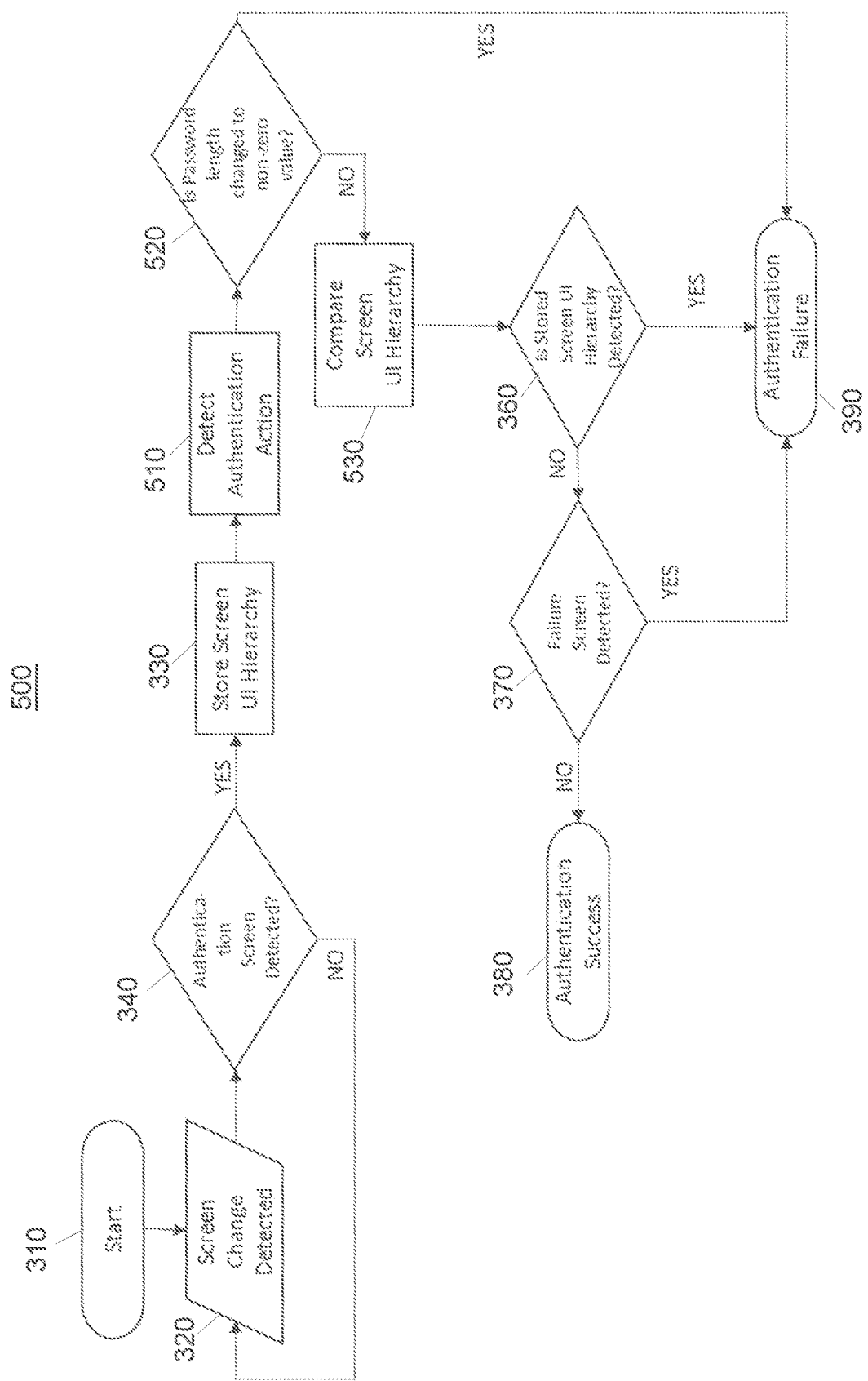
FIG. 5 shows a flow diagram of UX authentication and screen change detection processing where screens are maintained in an ordered list(s), according to some embodiments.

FIG. 5 shows a flow diagram 500 of UX authentication and screen change detection processing where screens are maintained in an ordered list(s), according to some embodiments. In one or more embodiments, in block 310, the processing starts either by running a process in the background or upon triggering the start based on block 320 detecting a screen change as described regarding block 250 (FIG. 2), such as detecting changes in a frame buffer of the screen of an electronic device, or other similar functionalities. In block 340 it is determined whether an authentication screen action is detected. Many mobile OS platforms provide ways to indicate that a UI element is of a password input type. This can be used to determine the password field on the screen. The submit/login button can be determined using heuristics and searching for a UI element on the password screen that has a "Submit" or "Login" or any equivalent word value as its text (this can be changed to use the corresponding words in different languages as well). The detection of the authentication screen and the pressing/selection of the submit/login button and the completion of the authentication operation are part of the functions of this processing block. If block 340 detects an authentication screen action, the processing proceeds to block 330, otherwise processing returns to block 320 awaiting detection of a screen change. In block 330 the screen UI hierarchy is stored in memory. The UI hierarchy is usually provided by many mobile OS platforms and the UI hierarchy can be easily obtained from the UI framework of such platforms. Once the UI hierarchy for a screen is obtained, a unique ID is assigned for each UI element and then assign a unique ID for each screen based on a standard hashing algorithm of all children UI elements. Each Screen is stored with its hashcode and an ordered list of its child elements. Each child element in turn is stored with its hashcode along with an ordered list of its child elements (similar to a tree structure). At the top level all screens displayed until the authentication screen is showed are stored in an ordered list.

In some embodiments, in block 330 the screen UI hierarchy is stored in memory. The UI hierarchy is usually provided by many mobile OS platforms and the UI hierarchy can be easily obtained from the UI framework of such platforms. Once the UI hierarchy for a screen is obtained, a unique ID is assigned for each UI element and then assign a unique ID for each screen based on a standard hashing algorithm of all children UI elements. Each Screen is stored with its hashcode and an ordered list of its child elements. Each child element in turn is stored with its hashcode along with an ordered list of its child elements (similar to a tree structure). At the top level all screens displayed until the authentication screen is showed are stored in an ordered list. The ordered list of screens and its UI hierarchy are only stored when the authentication screen is detected.

In one or more embodiments, in block 510 detection of an authentication action is performed. By checking if the password field value has changed in length except zero value after the pressing of the submit/login button, a determination that the authentication has failed can be made (this usually corresponds to a user trying a new password, any addition or subtraction or character will cause the result of authentication to fail). This failure detection optimization will not require UI hierarchy comparison (which saves time). After the authentication action detection processing in block 510 completes its operation, in block 520 it is determined whether the password length is changed to a non-zero value or not. If it is determined that the password length is changed to a non-zero value, processing continues to block 390 where the authentication is considered as failed. Otherwise, processing proceeds to block 530 where a screen UI hierarchy comparator captures the UI hierarchy of the screen and compares it with each screen information stored in the ordered list of screen information previously stored in block 330. In block 360, if the authentication screen remains or any of the previous screens are displayed, in both cases these are part of the ordered list of screen information and results in the authentication failure in block 390. If the screen is a new screen and is determined to be a failure screen by the authentication failure screen detector processing of block 370, then the authentication is considered as failed in block 390. Otherwise, the authentication is considered as successful in block 380. In some embodiments, the authentication failure screen detection processing of block 370 determines authentication failure using heuristics and searching for a UI element on the screen that appears after the authentication screen, which is not any previously stored screens, and has the term "Failed" or "Retry" or any equivalent word value as its text (this can be changed to use the corresponding words in different languages as well).

Figure 6:
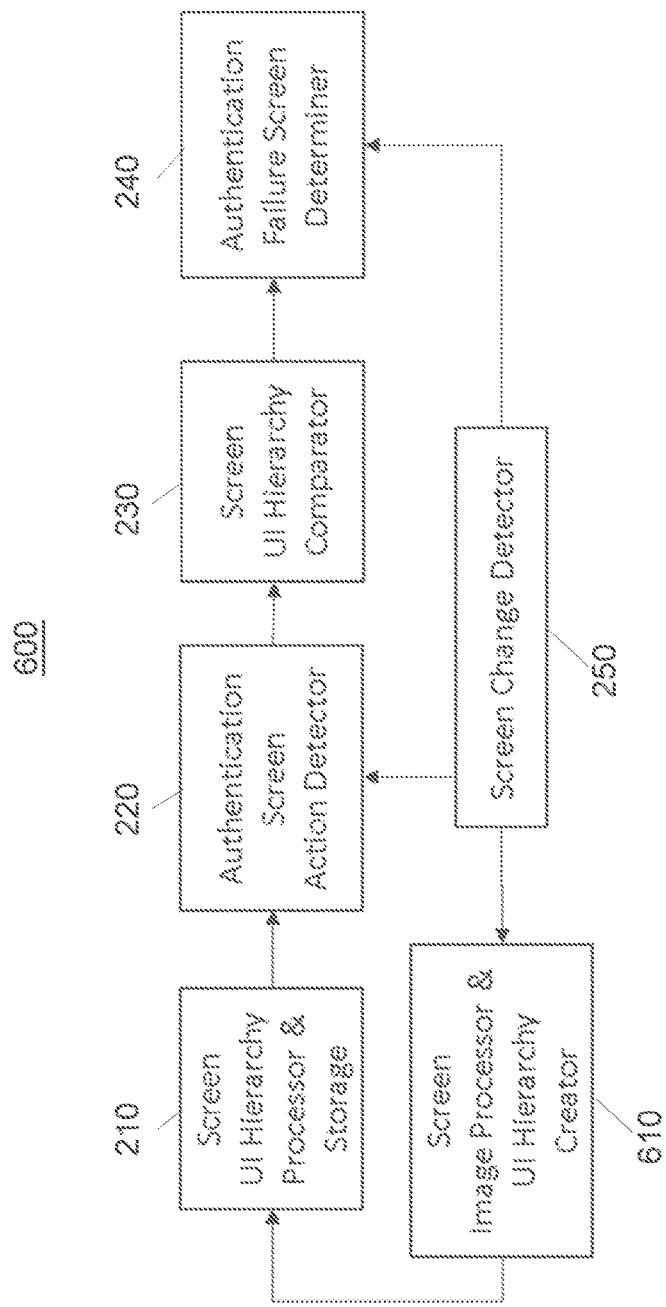
FIG. 6 shows a block diagram of a flow for UX authentication and screen change detection where a UI hierarchy structure is derived, according to some embodiments.

FIG. 6 shows a block diagram of a flow 600 for UX authentication and screen change detection where a UI hierarchy structure is derived, according to some embodiments. In some embodiments, flow 600 is similar to flow 200 (FIG. 2), but instead of using the UI frameworks UI hierarchy structure, in block 610 a screen image processor and UI hierarchy creator provides that every screen change determined in block 250 is followed by a screenshot of the screen and image processing is done on the screen to derive the UI hierarchy structure. This has the following advantages. The password based authentication result may be performed both from inside the electronic device as well as by outside the electronic device, by capturing a sequence of unique images and processing them to obtain the authentication result. It works on even those mobile UI frameworks, which do not rely on a UI hierarchy based approach.

Figure 7:
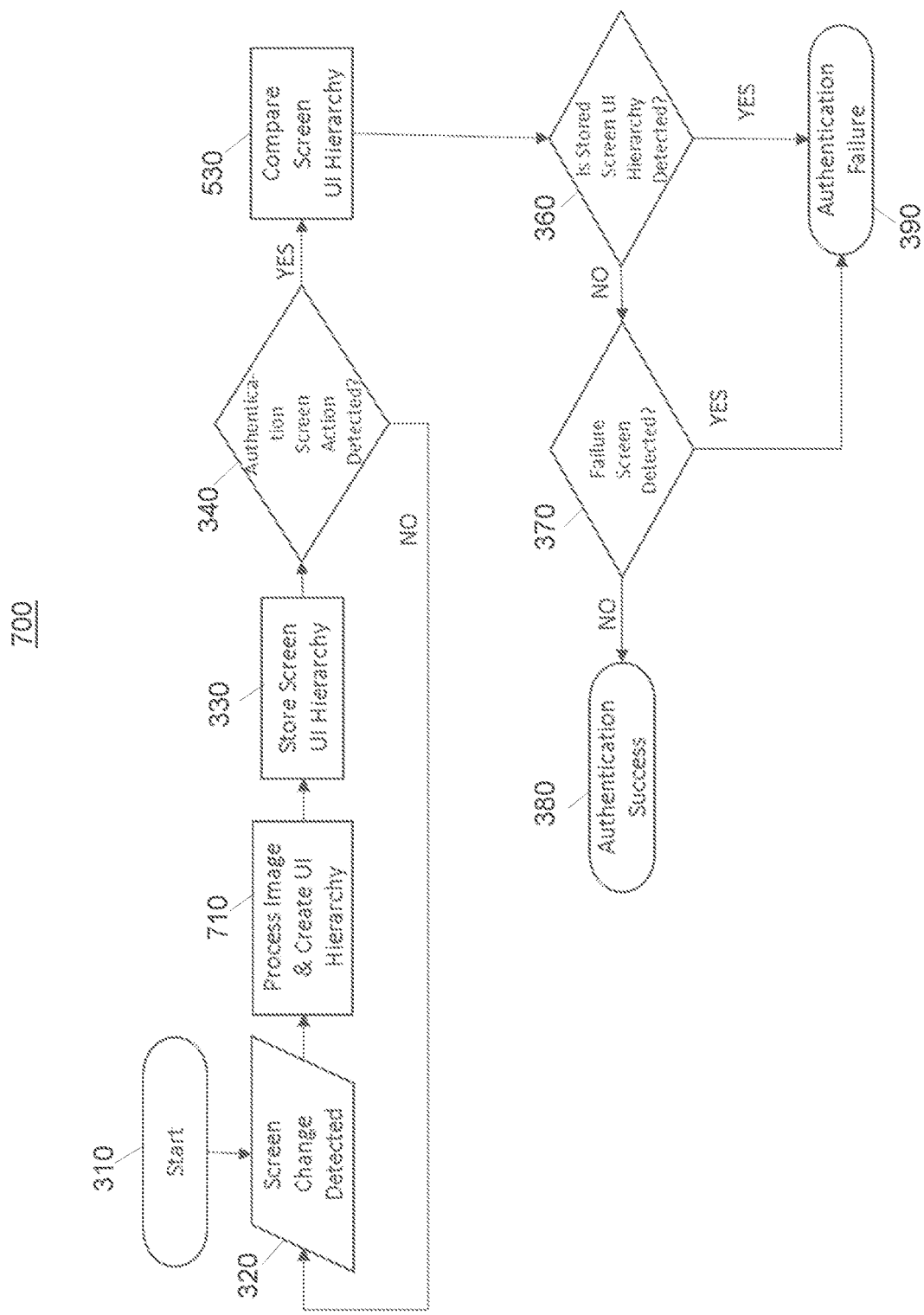
FIG. 7 shows a block diagram of for UX authentication and screen change detection processing where a UI hierarchy structure is derived, according to some embodiments.

FIG. 7 shows a block diagram 700 for UX authentication and screen change detection processing where a UI hierarchy structure is derived, according to some embodiments. In block 310, the processing starts either by running a process in the background or upon triggering the start based on block 320 detecting a screen change as described regarding block 250 (FIG. 2), such as detecting changes in a frame buffer of the screen of an electronic device, or other similar functionalities. In block 710 the screen image processor and UI hierarchy creator processes the screen image and creates a UI hierarchy based on the screen image. This does not need to follow the actual hierarchy created by the mobile UI framework, just a repeatable hierarchy based on the given screen image. The UI hierarchy created in this way has the UI element and its value as part of the hierarchy. In block 330 the screen UI hierarchy is stored in memory. The UI hierarchy is usually provided by many mobile OS platforms and the UI hierarchy can be easily obtained from the UI framework of such platforms. Once the UI hierarchy for a screen is obtained, a unique ID is assigned for each UI element and then assign a unique ID for each screen based on a standard hashing algorithm of all children UI elements. Each Screen is stored with its hashcode and an ordered list of its child elements. Each child element in turn is stored with its hashcode along with an ordered list of its child elements (similar to a tree structure). At the top level all screens displayed until the authentication screen is showed are stored in an ordered list. In block 340 it is determined whether an authentication screen action is detected. Many mobile OS platforms provide ways to indicate that a UI element is of a password input type. This can be used to determine the password field on the screen. The submit/login button can be determined using heuristics and searching for a UI element on the password screen that has a "Submit" or "Login" or any equivalent word value as its text (this can be changed to use the corresponding words in different languages as well). The detection of the authentication screen and the pressing/selection of the submit/login button and the completion of the authentication operation are part of the functions of this processing block. If block 340 detects an authentication screen action, the processing proceeds to block 530, otherwise processing returns to block 320 awaiting detection of a screen change.

In one or more embodiments, in block 530 a screen UI hierarchy comparator captures the UI hierarchy of the screen and compares it with each screen information stored in the ordered list of screen information previously stored in block 330. In block 360, if the authentication screen remains or any of the previous screens are displayed, in both cases these are part of the ordered list of screen information and results in the authentication failure in block 390. If the screen is a new screen and is determined to be a failure screen by the authentication failure screen detector processing of block 370, then the authentication is considered as failed in block 390. Otherwise, the authentication is considered as successful in block 380. In some embodiments, the authentication failure screen detection processing of block 370 determines authentication failure using heuristics and searching for a UI element on the screen that appears after the authentication screen, which is not any previously stored screens, and has the term "Failed" or "Retry" or any equivalent word value as its text (this can be changed to use the corresponding words in different languages as well).

Figure 8:
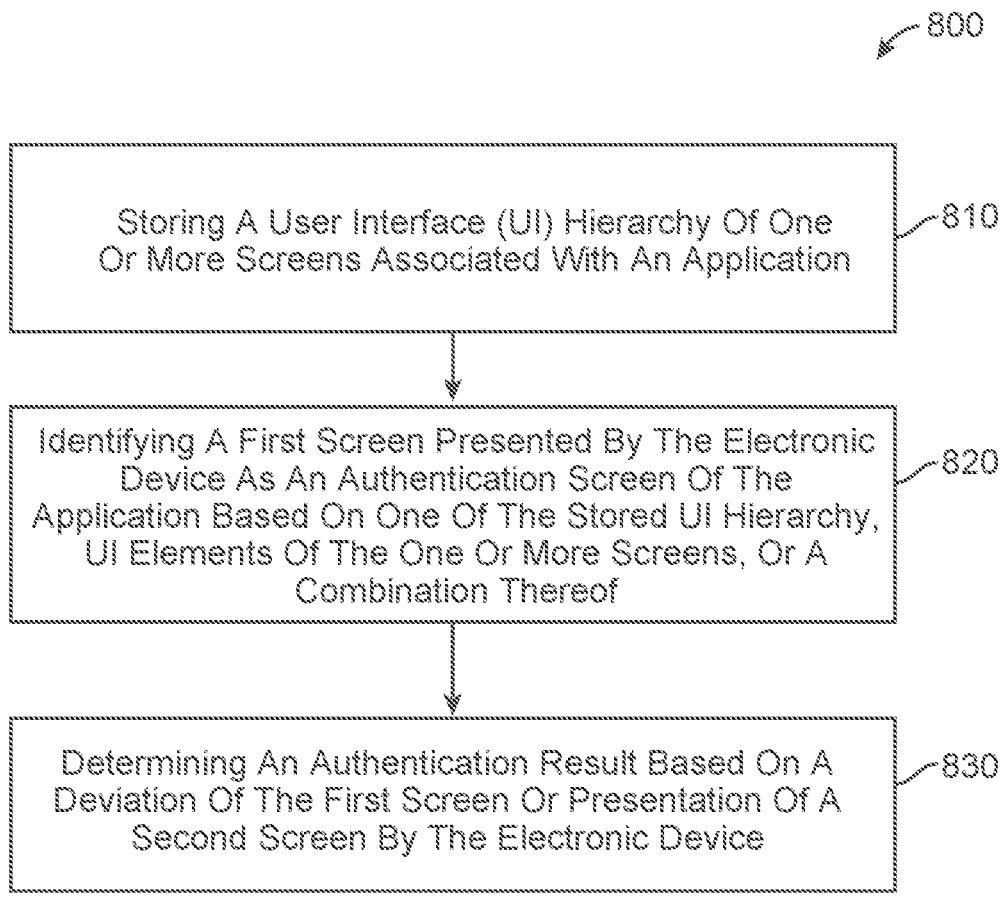
FIG. 8 shows a process for identifying a first screen presented by an electronic device as an authentication screen of an application based on a stored UI hierarchy, UI elements of one or more screens, or a combination thereof, according to some embodiments.

FIG. 8 shows a process 800 for identifying a first screen presented by an electronic device as an authentication screen of an application based on a stored UI hierarchy, UI elements of one or more screens, or a combination thereof, according to some embodiments. In block 810, process 800 provides for storing a UI hierarchy of one or more screens associated with an application. The one or more screens are presented by an electronic device (e.g., a smart phone, computing pad device, computing device, etc.). In block 820, process 800 provides for identifying a first screen presented by the electronic device as an authentication screen of the application based on one of the stored UI hierarchy, UI elements on the one or more screens, or a combination thereof. In block 830, process 800 provides for determining an authentication result based on a deviation of the first screen or presentation of a second screen by the electronic device.

In some embodiments, process 800 provides that the deviation of the first screen includes a length change to an input field of the first screen. In one or more embodiments, process 800 provides that the second screen is presented by the electronic device upon inputs to the first screen.

In one or more embodiments, process 800 provides that the storing of the UI hierarchy of the one or more screens associated with the application further includes assigning a respective screen identification (ID) to each screen of the one or more screens. Additionally, for each screen of the one or more screens, process 800 assigns a respective UI element ID to each individual UI element of each screen, and for storing the UI hierarchy as an ordered list. In some embodiments, the ordered list includes one or more screen IDs, with each screen ID being associated with its UI element IDs.

In some embodiments, in process 800 the identifying of the first screen presented by the electronic device as the authentication screen of the application based on the stored UI hierarchy, the UI elements on the one or more screens, or a combination thereof, further includes determining one or more UI elements of the first screen that includes at least one of: a first UI element for inputting a password, or a second UI element for submitting the input password.

In one or more embodiments, process 800 additionally provides for determining the authentication result based on the second screen presented by the electronic device further includes: determining that the second screen is not one of the one or more screens based on analysis by the electronic device of the stored UI hierarchy, and for determining authentication failure upon identifying a third UI element indicating a failure operation.

In some embodiments, process 800 further provides for determining the authentication result based on the second screen presented by the electronic device further includes determining authentication failure upon determining that the second screen is one of the one or more screens based on analysis by the electronic device of the stored UI hierarchy.

Figure 9:
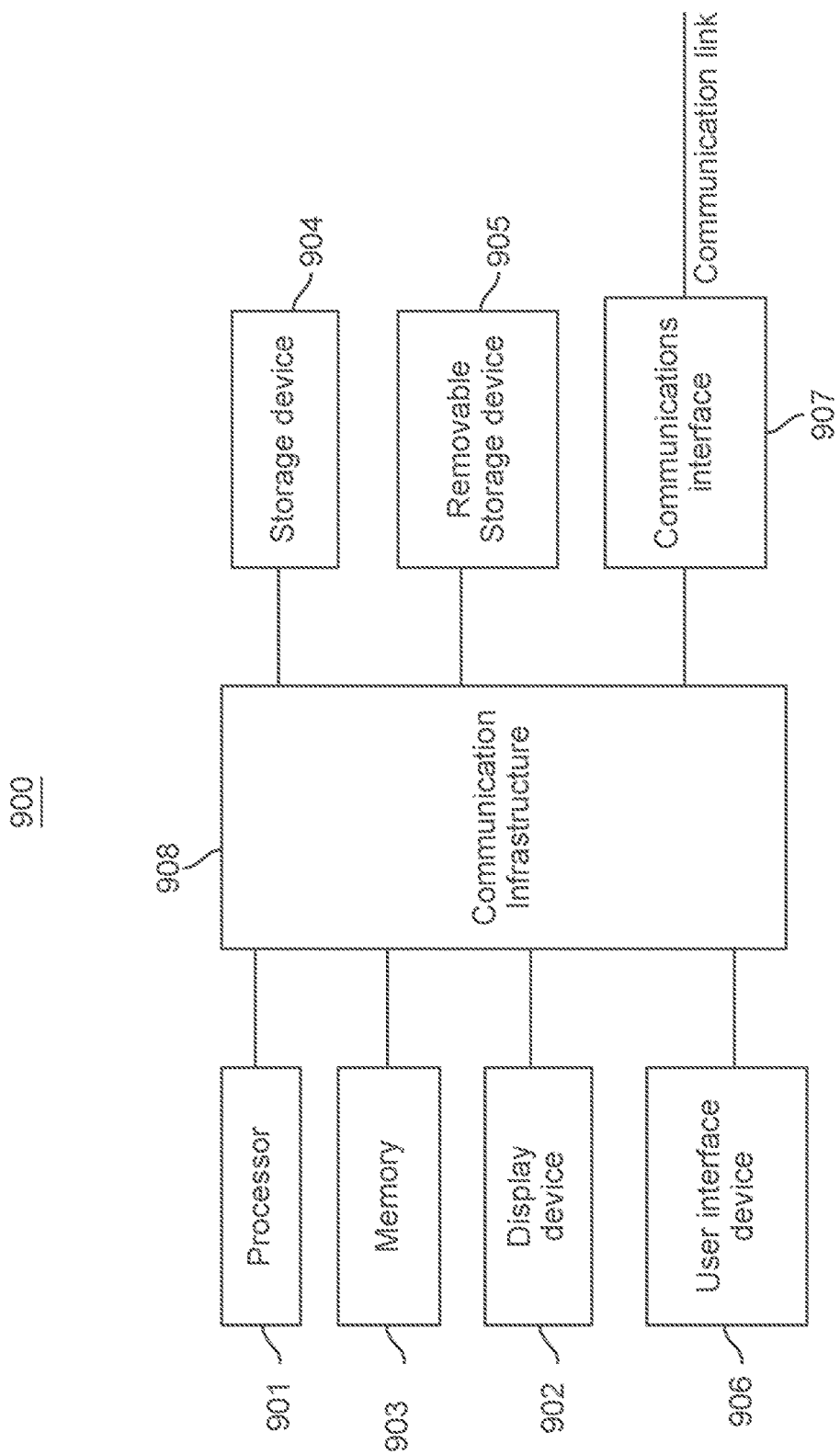
FIG. 9 is an exemplary high-level block diagram showing an information processing system comprising a computer system useful for implementing disclosed embodiments.

FIG. 9 is a high-level block diagram showing an information processing system comprising a computer system 900 useful for implementing the disclosed embodiments. Computer system 900 may be incorporated in a display device, such as display device 240 (FIG. 2), end device 350 (FIG. 3), etc. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), user interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for process 600 (FIG. 6) may be stored as program instructions on the memory 903, storage device 904 and the removable storage device 905 for execution by the processor 901.

Some embodiments may be applied to the following implementations (but are not limited thereto):

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method, comprising:
    storing a user interface (UI) hierarchy of one or more screens associated with an application, wherein the one or more screens are presented by an electronic device, and the UI hierarchy is stored as lists along with a code for each screen;
    displaying a first screen by the electronic device as an authentication screen of the application based on one of the stored UI hierarchy, UI elements of the one or more screens, or a combination thereof; and
    receiving, by the electronic device, authentication result that is based on a deviation of the first screen or presentation of a second screen by the electronic device based on a user authentication pattern that is utilized as a new authentication factor, wherein the new authentication factor is based on the user authentication pattern of successful logons to different applications.

2. The method of claim 1, wherein the deviation of the first screen comprises a length change to an input field of the first screen.

3. The method of claim 2, wherein the second screen is presented by the electronic device upon inputs to the first screen.

4. The method of claim 3, wherein storing the UI hierarchy of the one or more screens associated with the application further comprises:
    assigning a respective screen identification (ID) to each screen of the one or more screens;
    for each screen of the one or more screens, assigning a respective UI element ID to each individual UI element of each screen;
    the stored lists are ordered lists and the code is a hashcode; and
    the stored UI hierarchy comprising: each screen with its screen ID and an ordered list of its child UI elements, and each of the child UI elements with its hashcode, UI element ID and an ordered list of its child UI elements.

5. The method of claim 4, wherein the ordered list comprises one or more screen IDs, with each screen ID being associated with its UI element IDs.

6. The method of claim 4, wherein determining the authentication result based on the second screen presented by the electronic device further comprises:
    determining that the second screen is not one of the one or more screens based on analysis by the electronic device of the stored UI hierarchy; and
    determining authentication failure upon identifying a third UI element indicating a failure operation.

7. The method of claim 6, wherein determining the authentication result based on the second screen presented by the electronic device further comprises:
    determining authentication failure upon determining that the second screen is one of the one or more screens based on analysis by the electronic device of the stored UI hierarchy.

8. The method of claim 3, wherein identifying the first screen presented by the electronic device as the authentication screen of the application based on one of the stored UI hierarchy, the UI elements of the one or more screens, or the combination thereof further comprises:
    determining one or more UI elements of the first screen that includes at least one of: a first UI element for inputting a password, or a second UI element for submitting the input password.

9. A non-transitory processor-readable medium that includes a program that when executed by a processor performs an authentication method, comprising:
    storing, by the processor, a user interface (UI) hierarchy of one or more screens associated with an application, wherein the one or more screens are presented by an electronic device, and the UI hierarchy is stored as lists along with a code for each screen;
    displaying, by the processor, a first screen by the electronic device as an authentication screen of the application based on one of the stored UI hierarchy, UI elements of the one or more screens, or a combination thereof; and
    receiving, by the processor, an authentication result that is based on a deviation of the first screen or presentation of a second screen by the electronic device based on a user authentication pattern that is utilized as a new authentication factor, wherein the new authentication factor is based on the user authentication pattern of successful logons to different applications.

10. The non-transitory processor-readable medium of claim 9, wherein the deviation of the first screen comprises a length change to an input field of the first screen.

11. The non-transitory processor-readable medium of claim 10, wherein the second screen is presented by the electronic device upon inputs to the first screen.

12. The non-transitory processor-readable medium of claim 11, wherein storing the UI hierarchy of the one or more screens associated with the application further comprises:
    assigning a respective screen identification (ID) to each screen of the one or more screens;
    for each screen of the one or more screens, assigning a respective UI element ID to each individual UI element of each screen;
    the stored lists are ordered lists and the code is a hashcode; and
    the stored UI hierarchy comprising: each screen with its screen ID and an ordered list of its child UI elements, and each of the child UI elements with its hashcode, UI element ID and an ordered list of its child UI elements.

13. The non-transitory processor-readable medium of claim 12, wherein the ordered list comprises one or more screen IDs, with each screen ID being associated with its UI element IDs.

14. The non-transitory processor-readable medium of claim 12, wherein determining the authentication result based on the second screen presented by the electronic device further comprises:
    determining that the second screen is not one of the one or more screens based on analysis by the electronic device of the stored UI hierarchy; and
    determining authentication failure upon identifying a third UI element indicating a failure operation.

15. The non-transitory processor-readable medium of claim 14, wherein determining the authentication result based on the second screen presented by the electronic device further comprises:
    determining authentication failure upon determining that the second screen is one of the one or more screens based on analysis by the electronic device of the stored UI hierarchy.

16. The non-transitory processor-readable medium of claim 11, wherein identifying the first screen presented by the electronic device as the authentication screen of the application based on one of the stored UI hierarchy, the UI elements of the one or more screens, or the combination thereof further comprises:
determining one or more UI elements of the first screen that includes at least one of: a first UI element for inputting a password, or a second UI element for submitting the input password.

17. An apparatus comprising:
a memory storing instructions; and
at least one processor executes the instructions including a process configured to:
store a user interface (UI) hierarchy of one or more screens associated with an application, wherein the one or more screens are presented by an electronic device, and the UI hierarchy is stored as lists along with a code for each screen;
display a first screen by the electronic device as an authentication screen of the application based on one of the stored UI hierarchy, UI elements of the one or more screens, or a combination thereof; and
receive an authentication result that is based on a deviation of the first screen or presentation of a second screen by the electronic device based on a user authentication pattern that is utilized as a new authentication factor, wherein the new authentication factor is based on the user authentication pattern of successful logons to different applications.

18. The apparatus of claim 17, wherein:
the deviation of the first screen comprises a length change to an input field of the first screen; and
the second screen is presented by the electronic device upon inputs to the first screen.

19. The apparatus of claim 18, wherein storing the UI hierarchy of the one or more screens associated with the application further comprises:
assigning a respective screen identification (ID) to each screen of the one or more screens;
for each screen of the one or more screens, assigning a respective UI element ID to each individual UI element of each screen;
the stored lists are ordered lists and the code is a hashcode; and
the stored UI hierarchy comprising: each screen with its screen ID and an ordered list of its child UI elements, and each of the UI child elements with its hashcode, UI element ID and an ordered list of its child UI elements.

20. The apparatus of claim 18, wherein:
identifying the first screen presented by the electronic device as the authentication screen of the application based on the stored UI hierarchy, the UI elements of the one or more screens, or the combination thereof further comprises:
determining one or more UI elements of the first screen that includes at least one of: a first UI element for inputting a password, or a second UI element for submitting the input password;
determining the authentication result based on the second screen presented by the electronic device further comprises:
determining that the second screen is not one of the one or more screens based on analysis by the electronic device of the stored UI hierarchy; and
determining authentication failure upon identifying a third UI element indicating a failure operation, or determining authentication failure upon determining that the second screen is one of the one or more screens based on analysis by the electronic device of the stored UI hierarchy.

\* \* \* \* \*